United States Patent
Zelin et al.

(10) Patent No.: US 7,250,089 B2
(45) Date of Patent: Jul. 31, 2007

(54) METHOD OF MANUFACTURING SEGMENTED BELT TIRES

(75) Inventors: Michael Zelin, Canal Fulton, OH (US); Mahmoud Assaad, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 160 days.

(21) Appl. No.: 10/965,941

(22) Filed: Oct. 15, 2004

(65) Prior Publication Data

US 2006/0081326 A1    Apr. 20, 2006

(51) Int. Cl.
*B29D 30/30*   (2006.01)
*B29D 30/44*   (2006.01)

(52) U.S. Cl. .............. 156/130; 156/133; 156/304.3

(58) Field of Classification Search .......... 156/124, 156/126, 130, 117, 133, 134, 304.3, 406.4
See application file for complete search history.

(56) References Cited

U.S. PATENT DOCUMENTS

| | | | |
|---|---|---|---|
| 1,313,286 A * | 8/1919 | Gammeter | 156/130 |
| 4,952,260 A * | 8/1990 | Oda | 156/130 |
| 5,062,462 A * | 11/1991 | Rye et al. | 152/548 |
| 5,242,001 A | 9/1993 | Kahrs et al. | |
| 5,441,587 A * | 8/1995 | Byerley | 156/406.2 |
| 6,394,160 B1 | 5/2002 | Assaad et al. | |
| 6,444,070 B1 | 9/2002 | Krawczyk | |
| 6,645,334 B1 | 11/2003 | Smith et al. | |
| 6,705,370 B1 | 3/2004 | Hamiel et al. | |
| 2006/0144500 A1* | 7/2006 | Lacagnina | 156/111 |

FOREIGN PATENT DOCUMENTS

| | | |
|---|---|---|
| EP | 0794049 A2 | 10/1997 |
| EP | 1211056 A2 | 5/2002 |
| EP | 1211058 A1 | 5/2002 |

OTHER PUBLICATIONS

European Search Report, dated Jan. 4, 2006.

\* cited by examiner

*Primary Examiner*—Geoffrey L. Knable
(74) *Attorney, Agent, or Firm*—Brouse McDowell; Roger D. Emerson; Timothy D. Bennett

(57) ABSTRACT

Three methods of constructing tires having functionally graded belts are provided. According to one method a bandage is used to hold neighboring belt segments in position so they may be simultaneously applied to a carcass. According to a second method, longitudinal incisions are applied to a belt ply to achieve the desired belt stiffness. According to a third method clamps are applied to a belt ply to reorient the belt cords.

15 Claims, 4 Drawing Sheets

METHOD OF MANUFACTURING SEGMENTED BELT TIRES

I. BACKGROUND OF THE INVENTION

A. Field of Invention

This invention pertains to the construction of pneumatic tires and more specifically, to methods for constructing pneumatic tires with functionally graded belts.

B. Description of the Related Art

In general, the construction of a radial ply tire involves the fabrication of a carcass with bead rings and sidewalls on a cylindrical drum followed by forming the carcass into a toroidal shape. One or more belt plies are then wrapped sequentially around the outer circumference of the carcass after which a tread is applied to the carcass on top of the belt. The "green" or uncured tire is then transferred to a tire mold where it is formed under pressure into a final shape and then cured or vulcanized.

It is well known that the particular belt used in the construction of the tire has a significant impact on the performance of the tire. Each belt is formed of one or more belt plies. Typically, each belt ply is reinforced with a plurality of closely spaced cords embedded in uncured rubber, the cords generally extending at an angle of between 15 degrees to 30 degrees with respect to the equatorial plane of the tire. When two belt plies are used, generally the cord angles are equal but aligned in opposite directions with respect to the equatorial plane. The cords used in belt plies may be formed of various materials including nylon, polyester, rayon, cotton, aramid and steel.

One recent advancement in tire belt construction is the use of segmented belts. A segmented belt includes at least one belt ply that is axially divided or segmented. U.S. Pat. Nos. 6,394,160 and 6,444,070, which have a common assignee and are fully incorporated herein by reference, describe a tire with a segmented belt and a method of constructing such a tire.

II. SUMMARY OF THE INVENTION

This invention is directed towards methods of constructing tires having functionally graded belts. A functionally graded belt has at least one belt ply having at least two distinct belt regions when moving axially along the width of the belt. It may be desired to have two or more belt plies each having distinct belt regions. The belt regions may be distinct in any way, including cord angles, cord spacing, gaps between the regions and stiffness characteristics. The previously mentioned use of segmented belts is one example of providing a functionally graded belt. This invention, however, provides an improved method of constructing tires with segmented belts and provides additional methods of constructing tires with functionally graded belts as well.

According to one aspect of this invention, a method of constructing a tire includes the steps of: (a) fabricating a carcass; (b) providing at least first and second belt segments each having first and second edges; (c) applying a first bandage over the second edge of the first belt segment and the first edge of the second belt segment to maintain the position of the first belt segment relative to the second belt segment; (d) simultaneously applying the first and second belt segments to the carcass with the second edge of the first belt segment juxtaposed to the first edge of the second belt segment; and, (e) applying a tread over the first and second belt segments.

According to another aspect of this invention, a method of constructing a tire includes the steps of: (a) fabricating a carcass; (b) providing a belt ply; (c) cutting selective belt cords along the length of the belt ply with a first incision to achieve a first desired belt stiffness; (d) applying the belt ply to the carcass; and, (e) applying a tread over the belt ply.

According to still another aspect of this invention, a method of constructing a tire includes the steps of: (a) fabricating a carcass; (b) providing a belt ply with cords at a first orientation; (c) adjusting the belt ply to create a first region with cords that remain at the first orientation and a second region with cords at a second orientation; (d) applying the belt ply to the carcass; and, (e) applying a tread over the belt ply.

The methods of this invention provide significant advantages because tires having functionally graded belts can be easily constructed thereby permitting the various parameters characterizing functionally graded belts to be optimized to improve tire life and performance.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

Figure 5:
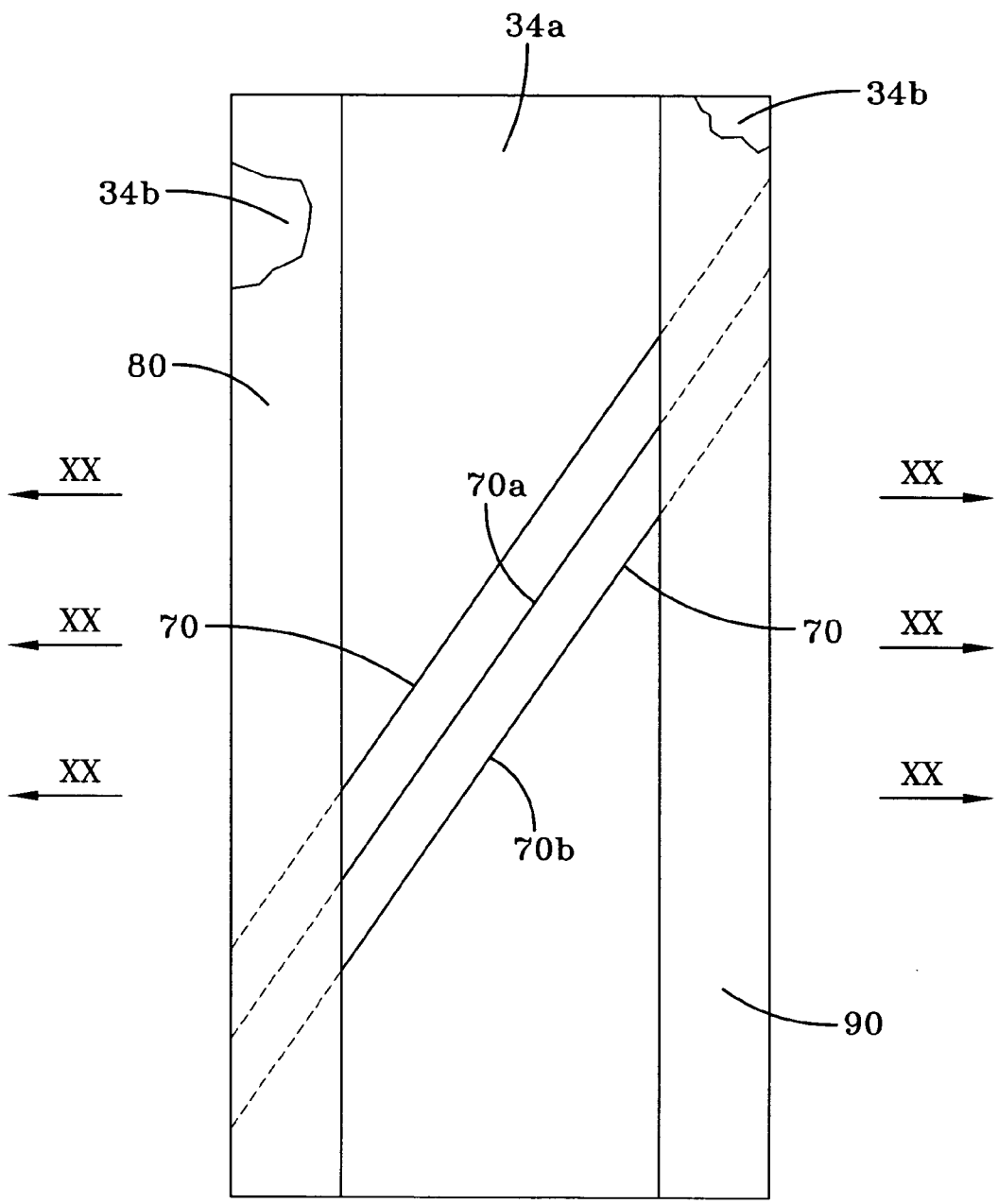
FIG. 5 is an illustration of a third method provided with this invention showing clamps used to reorient the belt cords.
Figure 6:
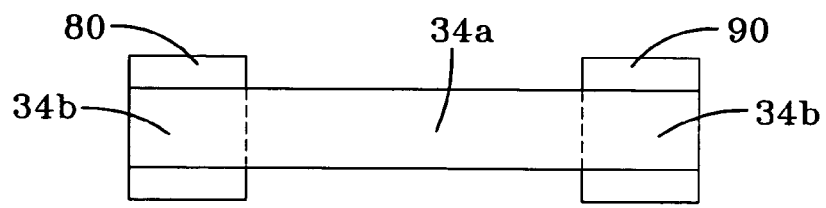

FIG. 6 an end view of the method illustrated in FIG. 5.

IV. DEFINITIONS

"Aspect Ratio" means the ratio of its section height to its section width. "Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt" means one or more belt plies.

"Belt Ply" means a ply of cords underlying the tread.

"Circumferential" means lines or directions extending along the perimeter of the surface of the annular tread perpendicular to the axial direction.

"Carcass" means the tire structure apart from the belt structure, tread, undertread, over the plies, but including the beads.

"Cut" means to fully separate into two parts with or as if with a sharp-edged instrument.

"Chafers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Incision" means not to fully separate into parts.

"Ply" means a layer of rubber-coated parallel cords.

"Radial" and "radially" mean directions radially toward or away from the axis of rotation of the tire.

"Section Height" means the radial distance from the nominal rim diameter to the outer diameter of the tire at its equatorial plane.

"Section Width" means the maximum linear distance parallel to the axis of the tire and between the exterior of its sidewalls, when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread" means the portion of the tire radially outside of the carcass for rolling contact with the surface of a road.

"Tread Width" means the arc length of the tread surface in the axial direction, that is, in a plane parallel to the axis of rotation of the tire.

V. DESCRIPTION OF THE PREFERRED EMBODIMENT

Referring now to the drawings wherein the showings are for purposes of illustrating a preferred embodiment of the invention only and not for purposes of limiting the same, three methods of constructing tires having functionally graded belts will be provided.

Figure 1:
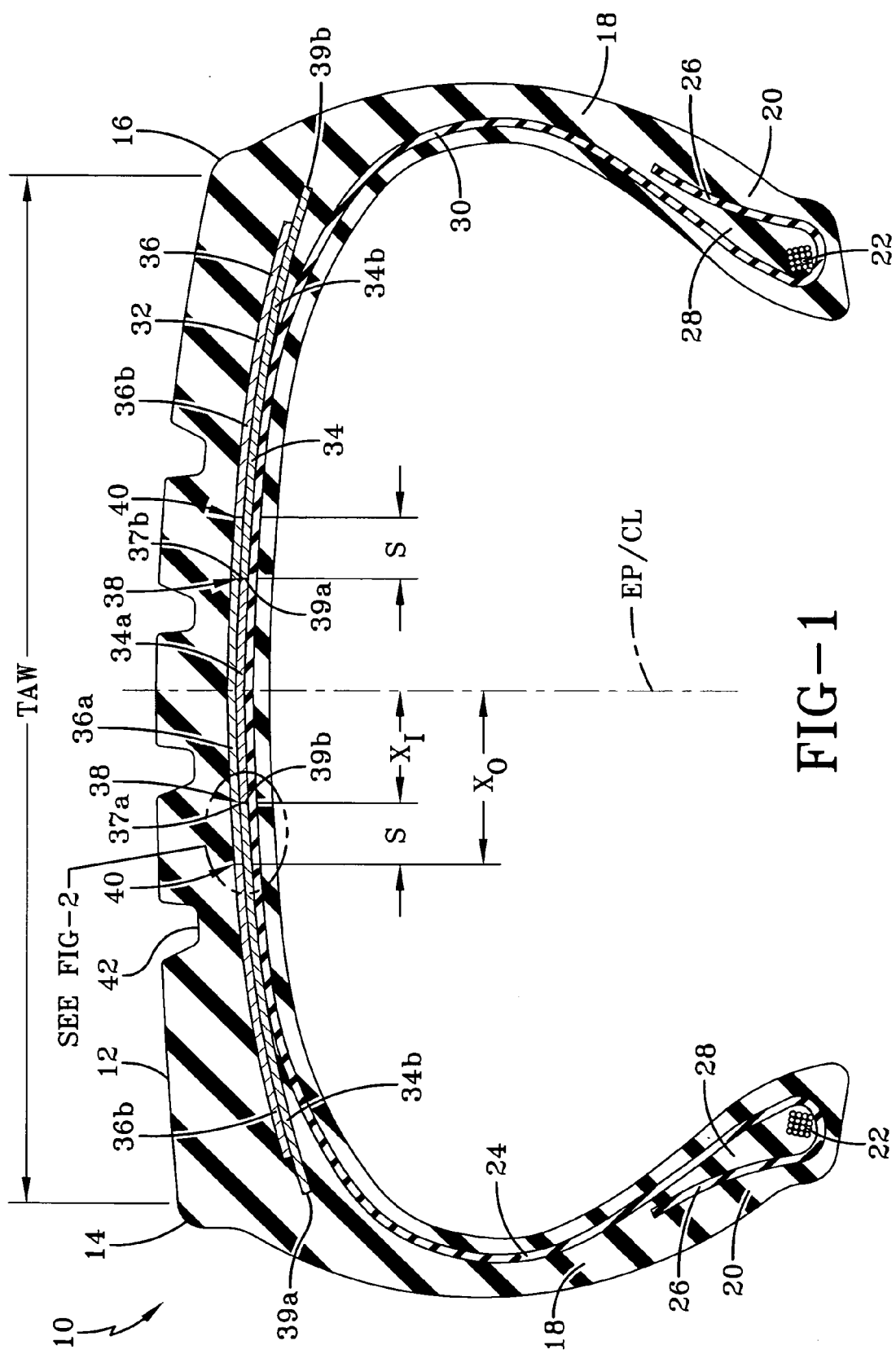
FIG. 1 is a cross sectional view of a tire built according to one of the methods of this invention.

With reference to FIG. 1, a tire 10 manufactured in accordance with the first method of this invention is illustrated. The tire 10 has a ground-engaging tread 12 that terminates in the shoulder segments at the lateral edges 14, 16 of the tread 12 respectively. A pair of sidewall segments 18 extend from tread lateral edges 14, 16 respectively and terminate in a pair of bead regions 20 each having an annular inextensible bead core 22 respectively. The tire 10 has a radial carcass 24 comprising at least one ply 30 which extends from one bead region 20 through one sidewall portion 18, tread portion 12, the opposite sidewall portion 18 to the opposite bead region 20. The tire 10 may have turnup ends 26 of the carcass 24 wrapped about bead cores 22. The turnup ends 26 may end at about the radial location of the maximum section width of the tire 10 or at any location desired by the tire engineer. Between the turnup ends 26 and the main structure of the carcass 24, and above the bead cores 22, is a bead apex 28. The tire 10 may include a conventional innerliner 35 forming the inner peripheral surface of the tire 10 if the tire is to be of the tubeless type. The tire 10 may also be provided with conventional bead reinforcement layers and toe guards in the bead region 20 of the tire (not illustrated).

With continuing reference to FIG. 1, placed circumferentially about the radially outer surface of the carcass 24 and beneath the tread 12 is a belt 32. The belt 32 provides lateral stiffness across the belt width to minimize lifting of the tread 12 from the road surface during operation of the tire 10. The belt 32 may be a single reinforcing belt ply or it may be comprised of multiple belt plies and may include cushion layers between the belt plies. In order to better illustrate certain further aspects of the invention, the illustrated belt 32 is formed from two belt plies 34, 36. Each belt ply 34, 36 may be comprised of reinforcing cords of a suitable material, such as aromatic polyamide, steel, glass fiber, carbon-fiber or nylon. In the preferred embodiment, the belt plies 34, 36 are each segmented to form at least three belt segments. However, the method of this invention will work well with any number of belt segments chosen with sound engineering judgment. The radially inner most belt ply 34 is divided into a central belt segment 34a, having first and second edges 37a, 37b and two belt side segments 34b, each having first and second edges 39a, 39b, respectively. The radially outer most belt ply 36 is similarly divided into a central belt segment 36a and two belt side segments 36b.

Still referring to FIG. 1, in one embodiment the source of the belt segments is a single belt ply cut longitudinally to form the belt segments. In this case, when each belt ply 34, 36 is segmented, the cords in each belt segment 34a, 34b, 36a, 36b of each belt ply 34, 36 are also inclined in the same direction. By maintaining the same cord inclination, the step of subdividing each belt ply 34, 36 into at least three belt segments decreases the stiffness of the belt plies 34, 36 across the width of the tire 10 from the tire centerline CL to the tread edges 14, 16, effectively creating hinge points 38, 40 in the respective belt plies 34, 36. Reducing the stiffness of the belt plies 34, 36 across the width of the tread in this manner reduces the strain at the edge of the belts 34, 36 and reduces the belt edge separation.

With continuing reference to FIG. 1, in another embodiment the belt segments may be formed from different belt plies. This provides additional design options for the tire engineer. For one example, the cords in each belt segment 34a, 34b, 36a, 36b of each belt ply 34, 36 may not be inclined in the same direction. For another example, the cord material used in the central belt segment 34a can be different than the cord material used in the side segments 34b. This permits the tire engineer to design, for instance, a belt ply 34 having a central belt segment 34a with steel cords and side segments 34b having fabric cords. For still another example, the rubber compound used in the central belt segment 34a can be different than the rubber compound used in the side segments 34b.

Figure 3:
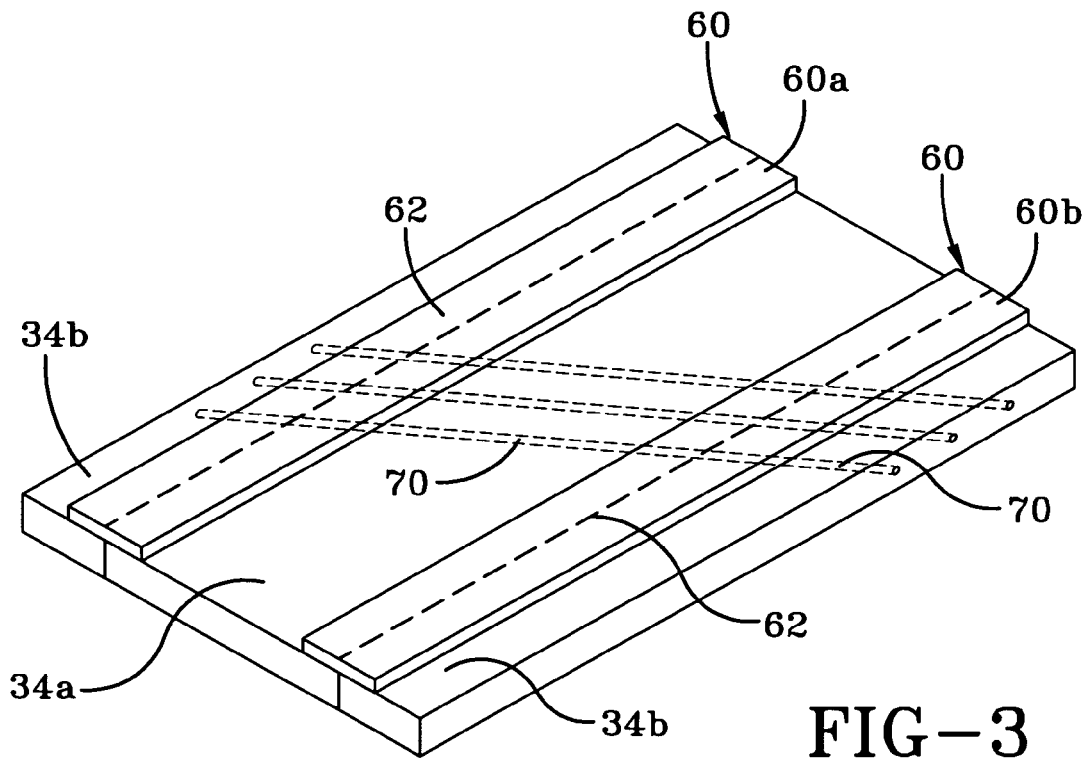
FIG. 3 is an illustration of a first method provided with this invention showing two bandages used to adhere to neighboring belt segments.

With reference now to FIGS. 1 and 3, in constructing the belt 32, the central belt segments 34a, 36a and two belt side segments 34b, 34b, 36b, 36b are laid next to each edge of the central belt segments 34a, 36a respectively. To help maintain the relative positions of the belt segments, a bandage 60 having adhesive properties may be applied to juxtaposed belt segments prior to their application to the carcass 24. More specifically, a first bandage 60a may be applied over the second edge 39b of one belt side segment 34b and the first edge 37a of the central belt segment 34a and a second bandage 60b may be applied over the second edge 37b of the central belt segment 34a and the first edge 39a of the other belt side segment 34b. The use of bandages 60a, 60b enable all the belt segments of a belt ply to be placed or applied simultaneously onto the carcass 24. This is a manufacturing improvement over existing methods that require each belt segment to be placed on the carcass 24 one at a time. To improve the adhesive properties of the bandage 60, one or more incisions 62, as shown in FIG. 3, may be made along the length of the bandage 60. Such incisions 62 can be made with a slitting machine or by any other method chosen with sound engineering judgment.

Figure 2:
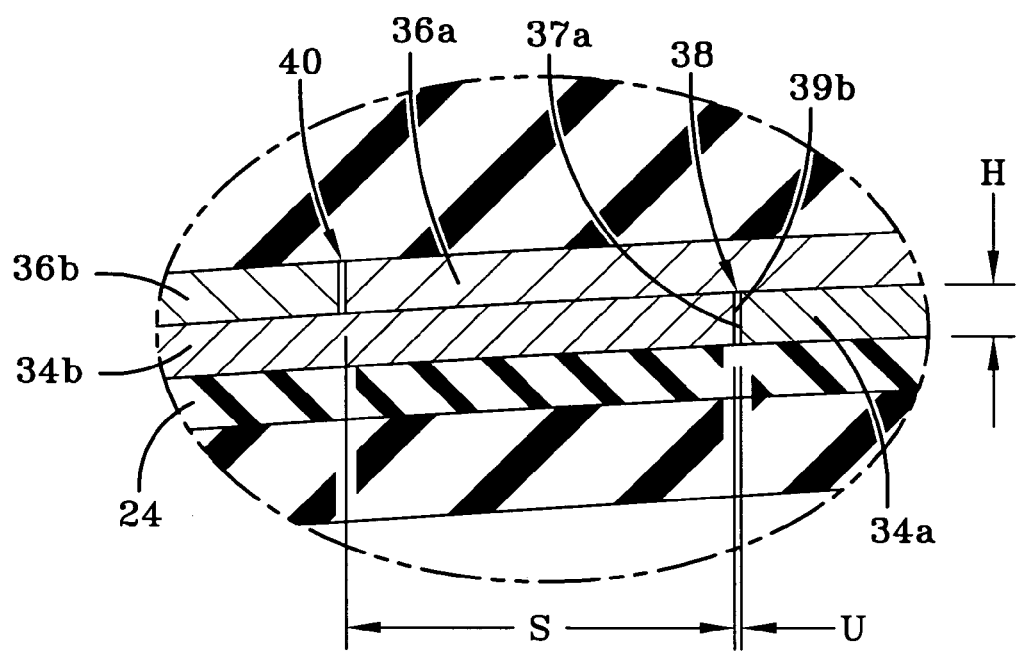
FIG. 2 is a close up cross sectional view of the edges of the belt segments of the tire of FIG. 1.

With reference to FIGS. 1–3, the bandages 60 may be formed of materials and used as selectively determined by the tire engineer. For one example, the bandage 60 may be used exclusively for its adhesive properties in maintaining the relative positions of the belt segments. In this case, the bandage 60 may be formed of any type of tape chosen with sound engineering judgment. After the belt segments of a belt ply are simultaneously applied to the carcass 24, the bandages 60a, 60b are removed. Then the tread 12 is applied over the belt segments. This is the condition shown in FIG. 2. For another example, the bandage 60 may also be used as an element of the tire 10. In this case, for instance, the bandage 60 can be made of a polymer having a good rubber adhesion, such as Nylon-6, that will act a zero degree belt. The tread 12 is then applied over the belt segments and over the bandage 60.

With reference now to FIG. 2, the region of the belt 32 where the belt plies 34, 36 are segmented, creating the hinge points 38, 40, is more clearly illustrated. The axial distance S between the hinge points 38, 40 of the inner ply 34 and the outer ply 36 is selectively predetermined and may be chosen to be greater than the radial distance H between the radially inner surface of adjacent plies 34, 36. The distance or gap U between the edges of the belt segments 34a, 34b, 36a, 36b is also selectively predetermined and may have a maximum width equal to the distance H between the radially inner surfaces of adjacent plies 34, 36, and a minimum width of zero. Another variable for the tire engineer to use is the width of each belt segment. The width W1 of the central belt segment 34a may differ from the width W2 of the belt side segments 34b, 34b, as shown in FIG. 1. It is to be understood that these distances S, H, U, W1 and W2 are exemplary only and that this invention works well with any such distances chosen with sound engineering judgment. In cases where the bandage 60 is used as an element of the tire 10, the bandage 60 material may flow into the gap U during curing of the tire.

Figure 4:
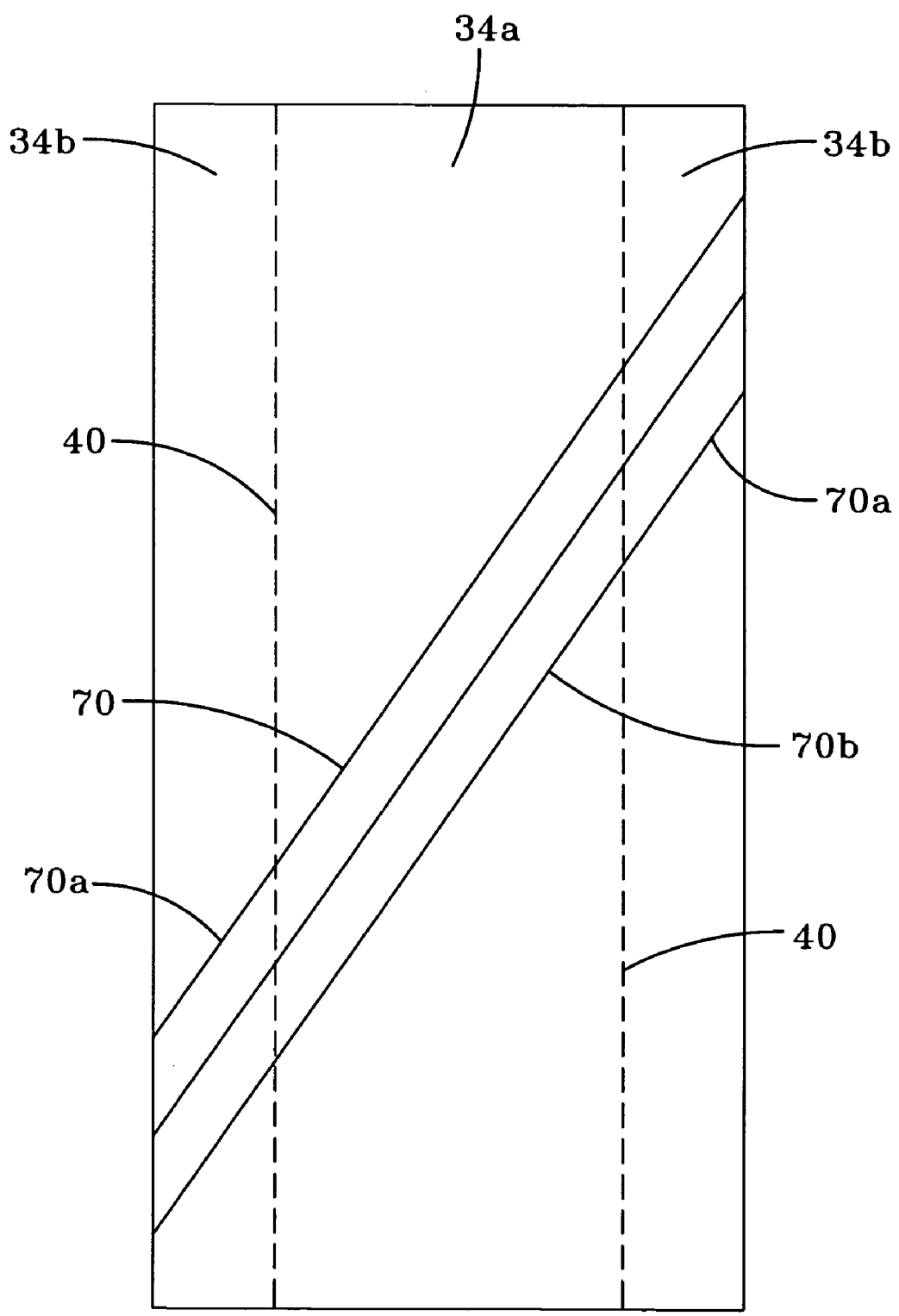
FIG. 4 is an illustration of a second method provided with this invention showing two incisions made along the length of the belt ply.

With reference now to FIGS. 1–2 and 4, a tire 10 having functionally graded belts manufactured in accordance with the second method of this invention will now be described. A tire 10 made according to this method has components similar to those described in the first method and thus the tire 10 illustrated in FIG. 1 is useful. It should be noted, however, that with this method the belt plies 34, 36 are not separated into belt segments. Instead, the belt plies 34, 36 are continuous tire components. Prior to applying the belt ply 34 to the carcass 24, however, first and second incisions 40, 40 may be added to the along the length of the belt ply 34. The purpose of the incisions 40, 40 is to cut selective belt cords 70 along the length of the belt ply 34 to achieve a desired belt stiffness. The particular incision made, cutting every other cord 70 or every third cord 70 for two examples, can be varied according to the tire engineer's design requirement. Such incisions can be produced using a variety of methods including profiled knives or slitting cutters which utilize serrated disk knives. After the incisions 40, 40 have been made, the radially inner most belt ply 34 may be divided into a central belt region 34a and two belt side regions 34b. The radially outer most belt ply 36 may similarly be divided into a central belt region 36a and two belt side regions 36b. Of course the number of belt regions created can be any chosen with sound engineering judgment. The use of incisions 40, 40 is a manufacturing improvement over existing methods that require each belt region, in the form of a separate belt segment, to be placed on the carcass 24 one at a time.

With reference now to FIGS. 1 and 5–6, a tire 10 having functionally graded belts manufactured in accordance with the third method of this invention will now be described. A tire 10 made according to this method again has components similar to those described in the first method and thus the tire 10 illustrated in FIG. 1 is useful. It should be noted, however, that with this method the belt plies 34, 36 are not separated into belt segments. Instead, the belt plies 34, 36 are continuous tire components. Prior to applying the belt plies 34, 36 to the carcass 24, however, either or both belt plies 34, 36 may first be adjusted to change the cord 70 orientation across the axially width of the plies. After the cord 70 orientation adjustments have been made, the radially inner most belt ply 34 may be divided into a central belt region 34a and two belt side regions 34b. The radially outer most belt ply 36 may similarly be divided into a central belt region 36a and two belt side regions 36b. Of course the number of belt regions created can be any chosen with sound engineering judgment.

With continuing reference to FIGS. 1 and 5–6, in the preferred embodiment, this adjustment is accomplished with the use of first and second clamps 80, 90. The first claim 80 is tightened to firmly grasp or hold one belt side region, 34b or 36b. The second clamp 90 is similarly tightened to firmly grasp or hold the opposite belt side region, 34b or 36b. The first clamp 80 is then moved relative to the second clamp 90 in order to change the cord 70 orientation between the central belt region 34a or 36a and the two belt side regions 34b or 36b. In one embodiment, the first and second clamps 80, 90 are moved relatively laterally as shown with arrows XX. In this case, the cord 70a orientation in the belt side regions will remain as they were initially. The cord orientation 70b in the central belt region, however, will change from the initial orientation. If the first and second clamps 80, 90 are moved apart from each other, as shown with arrows XX, then the cords 70b in the central belt region will adjust or orient to a lesser cord angle. In another embodiment, the first and second clamps 80, 90 are moved to create a shearing action. In other words, the first and second clamps 80, 90 are moved relatively both laterally and longitudinally. In this case, the cord 70a orientation in the belt side regions will remain as they were initially. The effect on the cord orientation 70b in the central belt region will depend on the cord 70 material and the related stiffness characteristic. When the cord stiffness is relatively low, such as when the cord material is a fabric, the cord orientation 70b in the central belt region may vary. When the cord stiffness is relatively high, a pair of plates 76, 76, illustrated in FIG. 6, may be used to hold the cord orientation 70b in the central belt region 34a in place while the clamps 80, 90 are moved. Once again, the particular amount and direction of clamp movement as well as the particular amount of cord orientation variation in the central belt region can be determined by the tire engineer. The use of clamps 80, 90 to reorient cords 70 is a manufacturing improvement over existing methods that require each belt region, in the form of a separate belt segment, to be placed on the carcass 24 one at a time.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method of constructing a tire comprising the steps of:
   (a) fabricating a carcass;
   (b) providing at least first and second belt segments each having first and second edges;
   (c) applying a first bandage over the second edge of the first belt segment and the first edge of the second belt segment to maintain the position of the first belt segment relative to the second belt segment;
   (d) applying the first and second belt segments simultaneously onto the carcass with the second edge of the first belt segment juxtaposed to the first edge of the second belt segment;
   (e) removing the first bandage from the first and second belt segments; and,
   (f) applying a tread over the first and second belt segments.

2. The method of claim 1 wherein step (b) comprises the step of:
   cutting a single belt ply into the at least first and second belt segments.

3. The method of claim 1 wherein step (b) comprises the step of:
   forming the first belt segment from a first belt ply and the second belt segment from a second belt ply.

4. The method of claim 1 wherein prior to step (c) the method comprises the step of:
   forming the first bandage of a polymer having a good rubber adhesion.

5. The method of claim 1 wherein prior to step (c) the method comprises the step of:
   making a first incision in the first bandage along the length of the first bandage.

6. The method of claim 1 wherein prior to step (c) the method comprises the step of:
   selectively providing a predetermined gap between the second edge of the first belt segment and the first edge of the second belt segment corresponding to desired belt performance.

7. The method of claim 6 wherein the method further comprises the step of:
   flowing bandage material into the gap during curing of the tire.

8. A method of constructing a tire comprising the steps of:
   (a) fabricating a carcass;
   (b) providing at least first and second belt segments each having first and second edges to form a first belt ply;
   (c) providing a second belt ply;
   (d) applying a first bandage over the second edge of the first belt segment and the first edge of the second belt segment to maintain the position of the first belt segment relative to the second belt segment;
   (e) applying the first and second belt segments forming the first belt ply simultaneously onto the carcass with the second edge of the first belt segment juxtaposed to the first edge of the second belt segment;
   (f) applying the second belt ply onto the first belt ply; and,
   (g) applying a tread over the second belt ply; and,
   wherein step (f) occurs after step (e).

9. The method of claim 8 wherein step (c) comprises the steps of:
   providing at least third and fourth belt segments each having first and second edges to form the second belt ply; and,
   applying a second bandage over the second edge of the third belt segment and the first edge of the fourth belt segment to maintain the position of the third belt segment relative to the fourth belt segment.

10. The method of claim 8 wherein step (b) comprises the step of:
    cutting a single belt ply into the at least first and second belt segments.

11. The method of claim 8 wherein step (b) comprises the step of:
    forming the first belt segment from a first belt ply and the second belt segment from a second belt ply.

12. The method of claim 8 wherein prior to step (d) the method comprises the step of:
    forming the first bandage of a polymer having a good rubber adhesion.

13. The method of claim 8 wherein prior to step (d) the method comprises the step of:
    selectively providing a predetermined gap between the second edge of the first belt segment and the first edge of the second belt segment corresponding to desired belt performance.

14. The method of claim 13 wherein the method further comprises the step of:
    flowing bandage material into the gap during curing of the tire.

15. The method of claim 8 wherein:
    step (b) further comprises the step of providing a third belt segment having first and second edges;
    after step (d) the method further comprises the step of applying a second bandage over the second edge of the second belt segment and the first edge of the third belt segment to maintain the position of the second belt segment relative to the third belt segment; and,
    step (e) further comprises the step of applying the third belt segment simultaneously onto the carcass with the second edge of the second belt segment juxtaposed to the first edge of the third belt segment.

* * * * *